(12) United States Patent
Morishima

(10) Patent No.: US 7,388,694 B2
(45) Date of Patent: Jun. 17, 2008

(54) METHOD, PROGRAM AND SYSTEM FOR IMAGE DRAWING

(75) Inventor: Morito Morishima, Fukuroi (JP)

(73) Assignee: Yamaha Corporation, Shizuoka-Ken (JP)

( * ) Notice: Subject to any disclaimer, the term of this patent is extended or adjusted under 35 U.S.C. 154(b) by 770 days.

(21) Appl. No.: 10/713,604

(22) Filed: Nov. 14, 2003

(65) Prior Publication Data

US 2004/0184370 A1    Sep. 23, 2004

(30) Foreign Application Priority Data

Nov. 15, 2002    (JP) .............................. 2002-332686

(51) Int. Cl.
| | |
|---|---|
| B41J 2/47 | (2006.01) |
| B41J 2/435 | (2006.01) |
| G03H 1/00 | (2006.01) |
| G02B 27/44 | (2006.01) |
| G02B 5/18 | (2006.01) |

(52) U.S. Cl. .......................... 359/1; 347/251; 347/252; 347/262; 359/566; 359/567

(58) Field of Classification Search ................ 347/246, 347/229, 224, 251–252, 262; 399/32; 430/321; 359/1, 566–567
See application file for complete search history.

(56) References Cited

U.S. PATENT DOCUMENTS

| | | | | | |
|---|---|---|---|---|---|
| 5,138,604 | A | * | 8/1992 | Umeda et al. ............... | 369/103 |
| 5,498,509 | A | * | 3/1996 | Shin et al. .................... | 430/321 |
| 5,587,772 | A | * | 12/1996 | Arai et al. ..................... | 399/32 |
| 5,608,717 | A | * | 3/1997 | Ito et al. ................... | 369/275.3 |
| 6,069,645 | A | * | 5/2000 | Vincent ...................... | 347/246 |
| 6,309,727 | B1 | * | 10/2001 | Mueller et al. ............. | 428/64.1 |
| 6,507,557 | B1 | * | 1/2003 | Ohno et al. .............. | 369/275.3 |
| 6,532,034 | B2 | * | 3/2003 | Hirotsune et al. ........... | 347/229 |

FOREIGN PATENT DOCUMENTS

| | | |
|---|---|---|
| CN | 1266527 A | 9/2000 |
| JP | 10-011804 | 1/1998 |

* cited by examiner

*Primary Examiner*—Hai C Pham
*Assistant Examiner*—Kainoa B Wright
(74) *Attorney, Agent, or Firm*—Harness, Dickey & Pierce, PLC

(57) ABSTRACT

Laser information is prepared which indicates the irradiation interval and intensity level to be irradiated on an optical disc in advance. Then, when image drawing is indicated together with the indication of the forming spacing for pits, a laser is controlled so as to achieve the irradiation interval and intensity level indicated by the laser information that corresponds to the indicated formation spacing to fabricate pits in the optical disc.

4 Claims, 10 Drawing Sheets

FIG. 7

| LINE \ COLUMN | 0 | 1 | ... | 9 | 10 | 11 | ... | 29 | 20 | 21 | ... | 29 |
|---|---|---|---|---|---|---|---|---|---|---|---|---|
| 0 | A | A | ... | | B | B | ... | | B | B | ... | |
| 1 | | | | | | | | | | | | |
| ⋮ | | ALL A | | | | ALL B | | | | ALL B | | |
| 9 | | | | | | | | | | | | |
| 10 | A | A | ... | | A | A | ... | | 0 | 0 | ... | |
| 11 | | | | | | | | | | | | |
| ⋮ | | ALL A | | | | ALL A | | | | ALL 0 | | |
| 19 | | | | | | | | | | | | |
| 20 | A | A | ... | | 0 | 0 | ... | | 0 | 0 | ... | |
| 21 | | | | | | | | | | | | |
| ⋮ | | ALL A | | | | ALL 0 | | | | ALL 0 | | |
| 29 | | | | | | | | | | | | |

| DIFFRACTION GRANTING PATTERN | LENGTH OF 202P | VARIATION QUANTITY | d | VARIATION QUANTITY | LASER INFORMATION |
|---|---|---|---|---|---|
| A | PL1 | Δ1 | d1 | δ1 | R1 |
| B | PL2 | Δ2 | d2 | δ2 | R2 |
| C | PL3 | Δ3 | d3 | δ3 | R3 |
| ⋮ | ⋮ | ⋮ | ⋮ | ⋮ | ⋮ |

| R | L | R |
|---|---|---|
| L | R | L |
| R | L | R |
| L | R | L |

R: RIGHT
L: LEFT

| I | L | I |
|---|---|---|
| L | I | L |
| I | L | I |
| L | I | L |

I: IMAGE
L: LETTER (POSITION I)  (POSITION II)  (POSITION III)
DISTANCE $d_1$   DISTANCE $d_2$   DISTANCE $d_3$

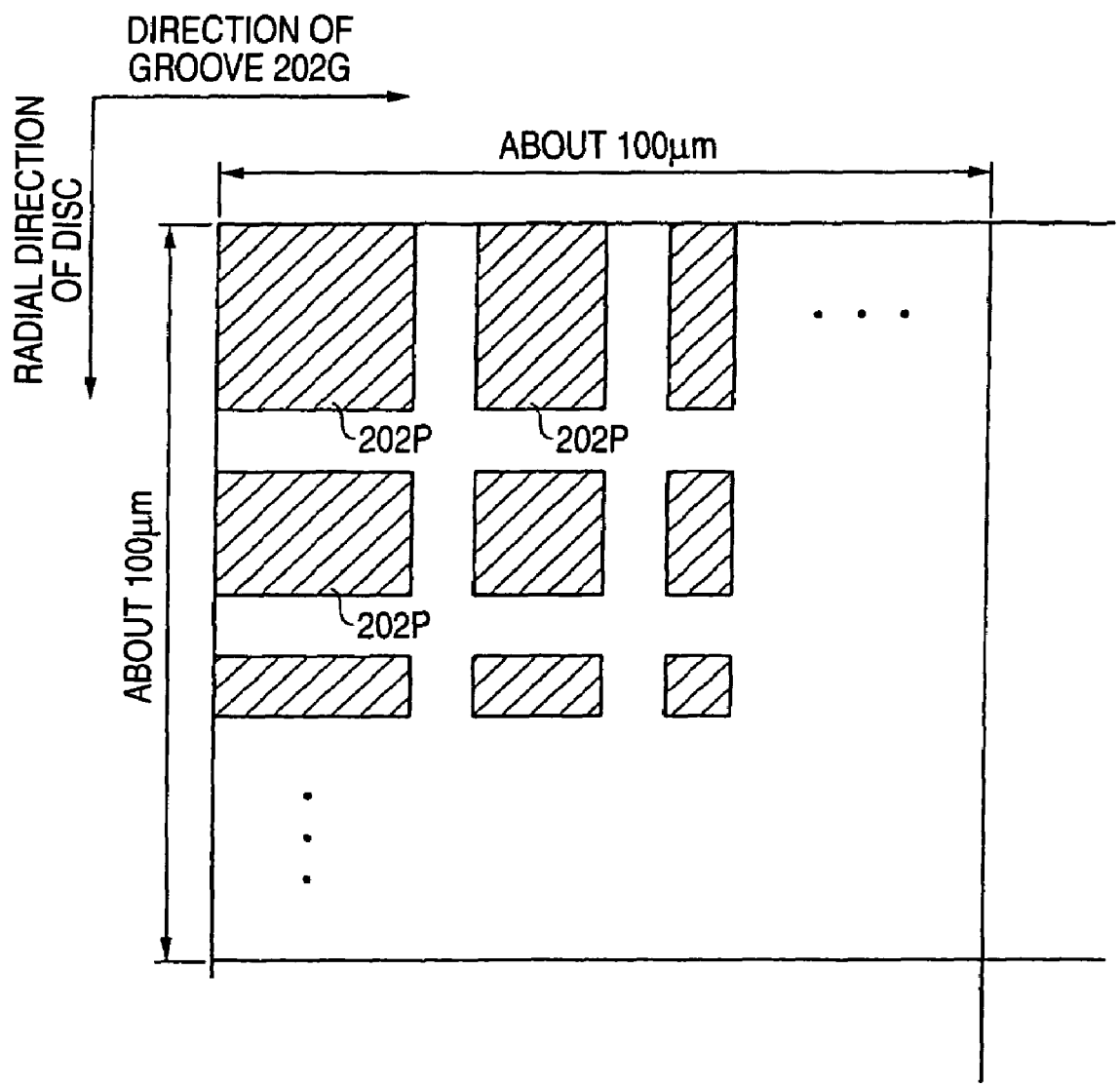

METHOD, PROGRAM AND SYSTEM FOR IMAGE DRAWING

BACKGROUND OF THE INVENTION

This invention relates to a technique for performing image drawing of high designing effect (i.e., holographic visual effect) on an optical disc in addition to data recording as the intrinsic recording object.

An optical disc recording apparatus for CD-R (Compact Disc-Recordable) that can form visible images in addition to the mainstream data recording (e.g., recording of music data) is known. This type of optical disc recording apparatus forms letters or pictures in the form of visible images by irradiating, with laser light, an unrecorded region not used for data recording to cause a thermal discoloration of the part of the unrecorded region.

In recent years, to form a visible image having a higher designing effect, an optical recording apparatus is proposed that can form a hologram on an optical disc (See, for example, Japanese Patent Laid-open No. 011804/1998).

However, the recording data for hologram formation are extremely large, thus accompanying an issue of requiring a long computing time for data preparation.

SUMMARY OF THE INVENTION

The invention has been devised in view of the above-mentioned aspect, and has an object of providing an image drawing method, and program, and image drawing system all of which can readily form visible images with high designing effect on an optical disc.

In order to solve the aforesaid object, the invention is characterized by having the following arrangement.

(1) A method of drawing an image on an optical disc by an optical disc recording apparatus which forms optically transformed light and dark portions on the optical disc by laser light irradiation, the method comprising:

a storing step of storing, in advance, laser information indicating irradiation interval and intensity level of the laser light to be applied to the optical disc associated with formation spacing defined between the optically transformed light and dark portions when the optically transformed light and dark portions have same lengths and formed at a constant interval; and a control step of controlling, when drawing of an image is instructed together with an indication of the formation spacing of the optically transformed light and dark portions, the laser light so as to correspond to the irradiation interval and the intensity level of the laser light indicated by the laser information corresponding to the indicated formation spacing.

(2) The method according to (1), wherein when a plurality of images are drawn, the control step controls the laser light so as to corresponds to the irradiation interval and the intensity level of the laser light indicated by the laser information corresponding to the formation spacing assigned to each image to be drawn.

(3) A method of drawing an image on an optical disc by an optical disc recording apparatus which forms optically transformed light and dark portion on the optical disc by laser light irradiation, the method comprising:

a storing step of storing laser information indicating irradiation timing and intensity level of the laser light to be applied to the optical disc for stepwisely changing at least one of length and formation spacing of the optically transformed light and dark portions; and a control step of controlling, when drawing of an image is instructed, the laser light irradiation based on the laser information.

(4) A computer readable recording medium storing a program for drawing an image on an optical disc by an optical disc recording apparatus which forms optically transformed light and dark portions on the optical disc by laser light irradiation, the program causing a computer to function as:

a storing unit for storing, in advance, laser information indicating irradiation interval and intensity level of the laser light to be applied to the optical disc associated with formation spacing defined between the optically transformed light and dark portions when the optically transformed light and dark portions have same lengths and formed at a constant interval; and a control unit for controlling, when drawing of an image is instructed together with an indication of the formation spacing of the optically transformed light and dark portions, the laser light so as to correspond to the irradiation interval and the intensity level of the laser light indicated by the laser information corresponding to the indicated formation spacing.

(5) A system for drawing an image on an optical disc including an optical disc recording apparatus which forms optically transformed light and dark portions on the optical disc by laser light irradiation, the system comprising:

a storing unit for storing, in advance, laser information indicating irradiation interval and intensity level of the laser light to be applied to the optical disc associated with formation spacing defined between the optically transformed light and dark portions when the optically transformed light and dark portions have same lengths and formed at a constant interval; and a control unit for controlling, when drawing of an image is instructed together with an indication of the formation spacing of the optically transformed light and dark portions, the laser light so as to correspond to the irradiation interval and the intensity level of the laser light indicated by the laser information corresponding to the indicated formation spacing.

BRIEF DESCRIPTION OF THE DRAWINGS

FIG. 7 is a diagram to explain the details of image data.

FIG. 8 is a diagram to explain the diffraction grating pattern.

FIG. 12 is a diagram to explain the actual effects of the invention.

DETAILED DESCRIPTION OF PREFERRED EMBODIMENTS

Embodiments according to the invention will be described with reference to the accompanying drawings.

The present embodiment assumes a CD-R disc as an optical disc and is related to an optical disc recording apparatus that can readily conduct drawing of images provided with a high designing effect as described above. First of all, the detail of the optical disc (CD-R disc) is described and followed by remarks on how the image drawing is carried out.

Configuration of Optical Disc

Figure 1A:
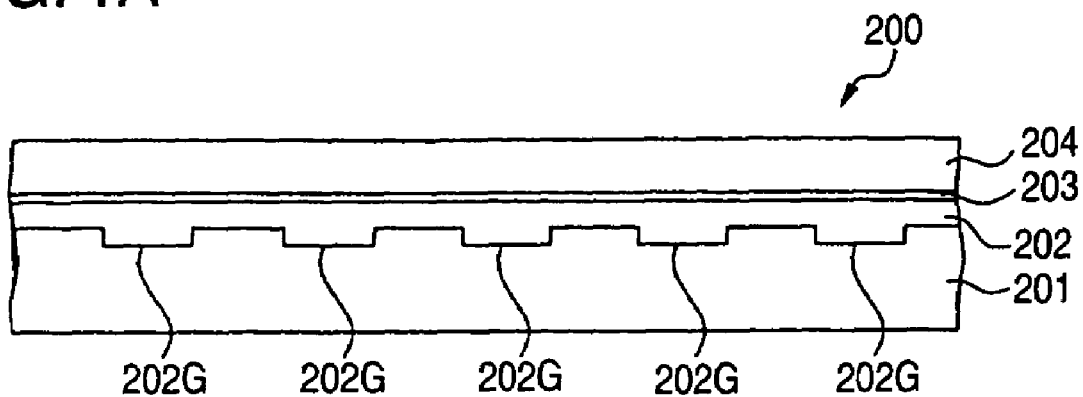
FIG. 1A is a side cross-sectional view of an optical disc 200 associated with an embodiment of the invention.

FIG. 1A is a cross-sectional view of an optical disc (CDR disc) 200. As shown in FIG. 1A, optical disc 200 has a structure stacking all of a base protective layer 201, a recording layer 202, a reflection layer 203, and a protective layer 204. By way of precaution, FIG. 1A is a diagram for explanation, and the dimensional ratios among each layer are not necessarily depicted correctly.

Grooves (guiding groove) 202G are formed spirally on the recording layer 202. When an ordinary data is recorded on optical disc 200, a laser light is applied along groove 202G (on-groove recording). When an amount of thermal energy exceeding a certain value is given by the laser light irradiation, a pit 202 P corresponding to the recorded data length is formed on the groove 202G, thereby recording the data. Incidentally, actual groove 202G is formed in a moderate meandering shape. Thus, disc positional information (address information) can be obtained by demodulating the meandering signal (signal reflected from the groove). However, as this technique is not directly related to the context of the invention, the meandering of groove 202G is not taken into consideration in the description to follow.

Figure 1B:
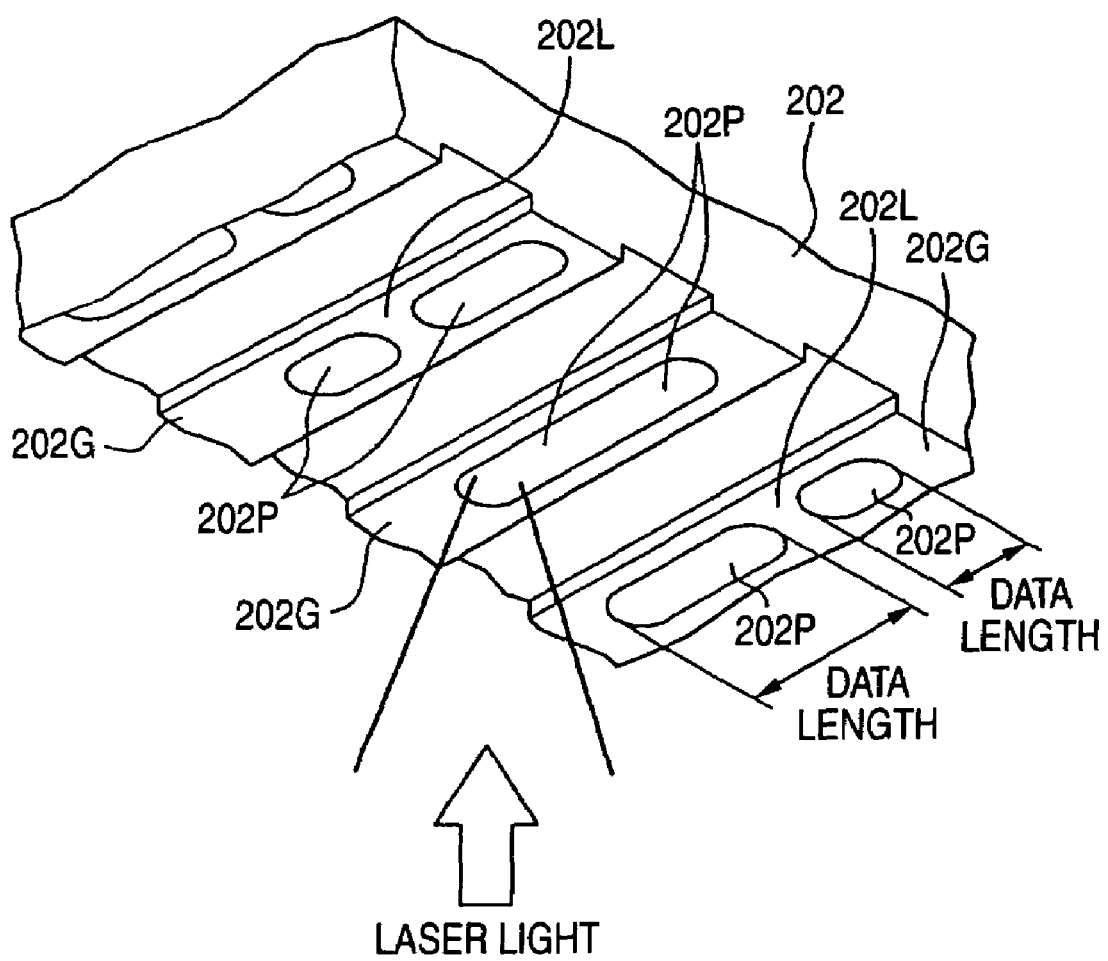
FIG. 1B is a diagram showing the situation in which pit 202P has been formed in the optical disc 200.

FIG. 1B is a diagram showing a state where a pit 202P has been formed on groove 202G as a result of laser light irradiation along groove 202g. The length of pit 202P corresponds to that of the recorded data length, and the length of each pit is various (ranging between several ten μm to several hundred μm). It is hardly assumed that the formation positions of the pits 202P on adjacent grooves 202G are aligned orderly.

When data are to be reproduced, a laser light of a low intensity level is applied along groove 202G. Here where the region sandwiched between two adjacent pits 202P is defined as a land 202L, then the reflectance of pit 202P differs from that of land 202L. Accordingly by detecting the change in the reflected light level obtained when a laser light is applied along groove 202G, the length of pit 202P corresponding to the data length can be detected. Based on such detection, the reproduction treatment of data is carried out.

Principle of the Invention

The inventors of the present invention speculated that, by forming many pits 202P having the same length with a fixed cycle repeatedly, regions of different reflectance are alternately formed, and that thus a diffraction grating may be provided on recording layer 202. Further, the inventors noticed the possibility that a visual effect as a hologram might be attained, since, when the optical disc 200 is viewed from a certain angle, the area of the diffraction grating thus formed can be visually recognized. And, as for these viewpoints, an experimental verification was carried out.

Figure 2A:
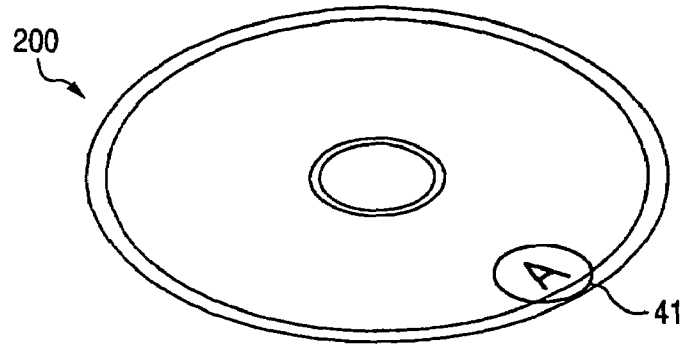
FIGS. 2A to 2C are diagrams showing the situation in which drawing of an image has been conducted for an optical disc 200.
Figure 2B:
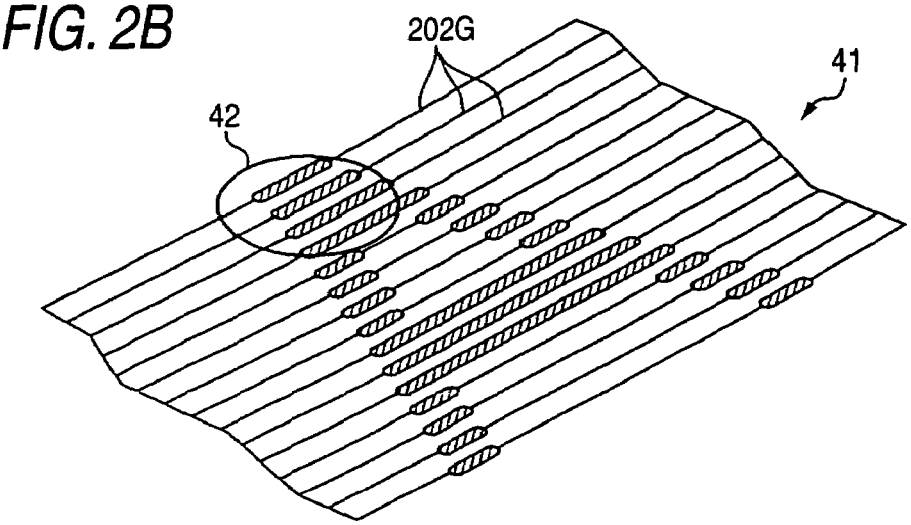
Figure 2C:
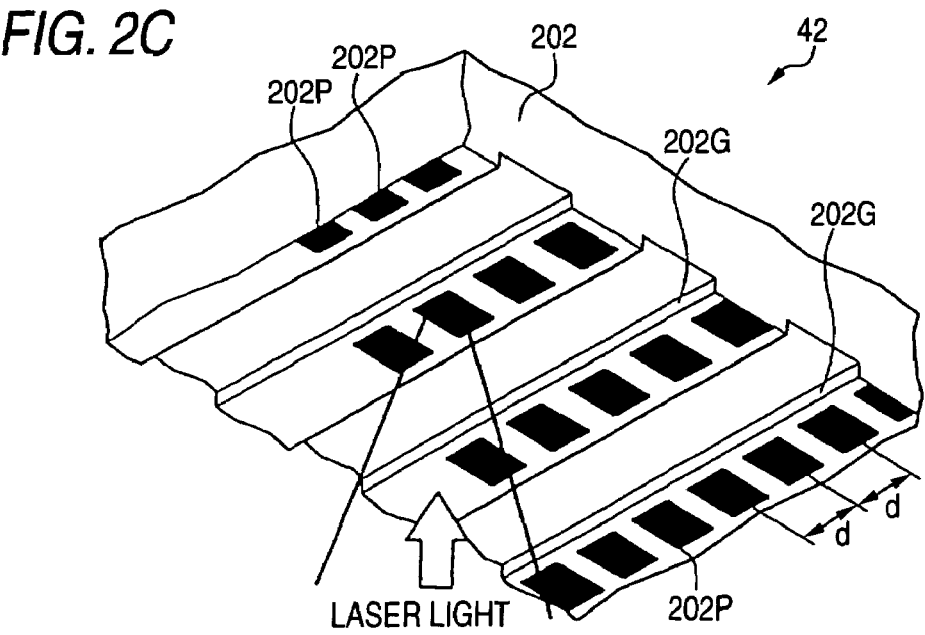

FIGS. 2A to 2C illustrate the situation in which an image has been drawn by forming a diffraction grating constituted by pits 202P on an optical disc 200 (recording layer 202).

FIG. 2A is an overall diagram of optical disc 200. FIG. 2B is a diagram enlarging the region 41 in FIG. 2A. FIG. 2C is a diagram further enlarging the region 42 in FIG. 2B. In FIG. 2C, the top and bottom are illustrated in a reversed manner in order to make clear the contrast to data recording (FIG. 1B).

FIGS. 2A to 2C show an example in which an alphabetical letter "A" has been drawn on optical disc 200 (recording layer 202). As shown in FIG. 2C, along the contour part of the letter "A", pits 202 of the same length with a constant spacing are formed to construct a diffraction grating, thereby forming the diffraction grating. The length of pit 202P which constitutes the diffraction grating is designed to be several times as long as the wavelength and shorter than the pit length used for data recording. As shown in FIG. 2C, pits 202P formed in an adjacent groove 202G, the formation positions are aligned in a state of orderly arrangement.

The mechanism with which the holographic visual perceiving effect is exhibited is now explained when an observer views the optical disc 200 in which a diffraction grating has been formed in this manner.

Figure 3:
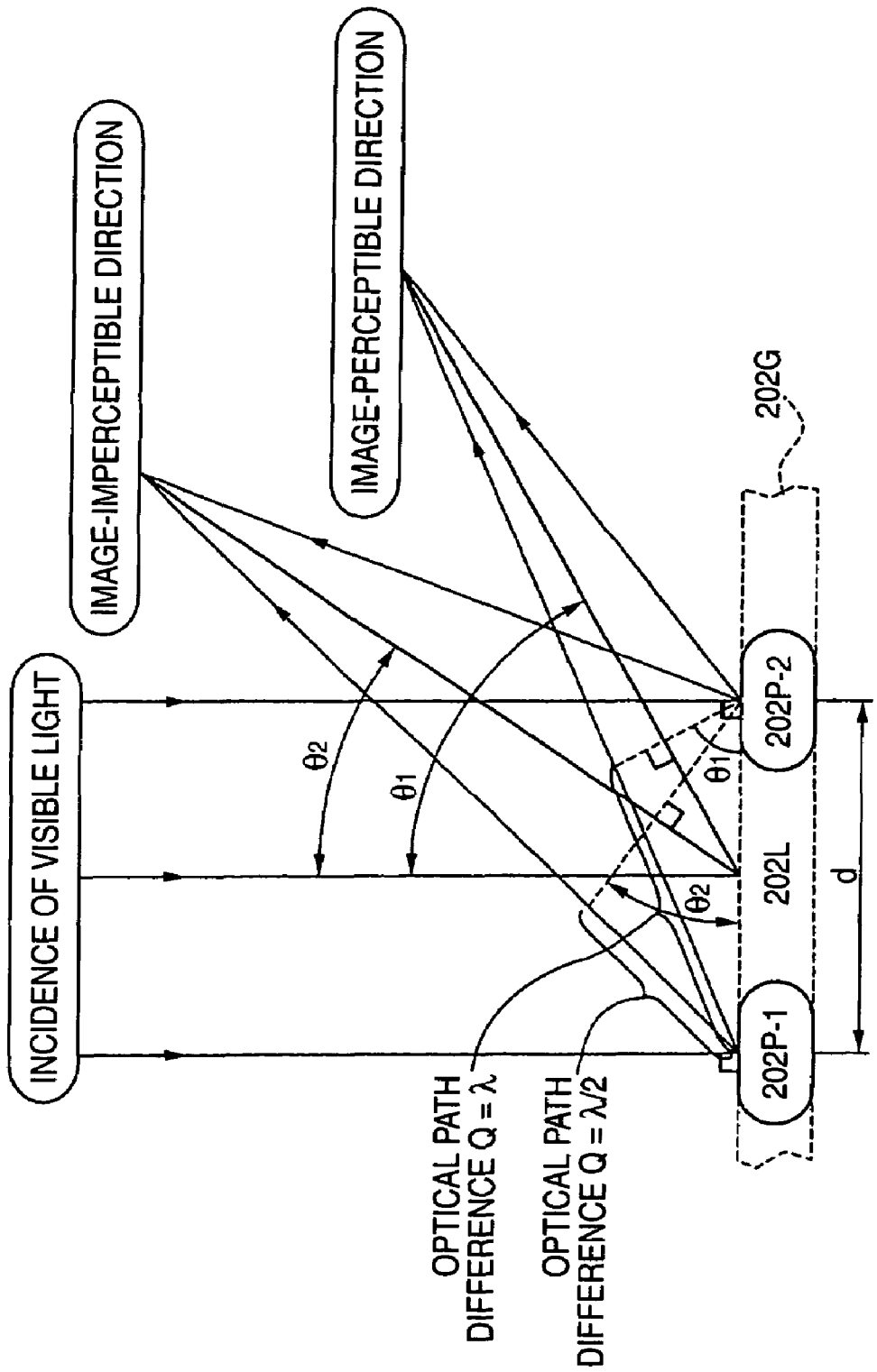
FIG. 3 is a diagram to explain the principle of the invention.

FIG. 3 shows the case in which, on groove 202G of recording layer 202, two pits 202P-1 and 202P-2 are formed in the form of cross-sectional view. The two pits 202P-1 and 202P-2 are arranged in such a manner that their center positions are separated by a distance D (Hereinafter, this distance is called inter-grating distance d.) The region sandwiched between two pits 202P-1 and 202P-2 represents a land 202L.

In FIG. 3, visible light (400 to 700 nm wavelength light) is incident in the direction vertical to the plane of recording layer 202. In the present discussion, the lights reflected by pits 202P-1 and 202P-2 are considered, and the light reflected by land 202L is assumed to be negligible.

The light incident on each pit 202P-1 or 202P-2 is reflected; the light reflected by pit 202P-1 interferes with the one reflected by pit 202P-2, and the two lights act to strengthen or weaken each other.

Under such a situation, a viewing angle is defined by the angle θ that is formed by the direction at which an observer (user) views optical disc 200 and the direction vertical to the plane of optical disc 200 (See FIG. 3.). By assuming the wavelength of the visible light impinging on optical disc 200 (recording layer 200) to be λ, the optical path difference Q between the light reflected by pit 202P-1 and that by pit 202P-2, respectively, is given by the following equation (1).

$$Q = d \sin\theta \qquad \text{Equation (1)}$$

At viewing angle θ at which this optical path difference Q is equal to the integral multiple of visible light wavelength λ, i.e., λ, 2λ, 3λ, - - -, the two reflected lights strengthen each other whereas at viewing angle θ at which an optical path difference Q is equal to the odd integral multiple of the half wavelength of visible light λ, i.e., λ/2, 3λ/2, 5λ/2, - - -, the two reflected lights weaken each other.

From these facts, when viewing angle θ satisfies the following equation (2), the two reflected lights strengthen each other, and the observer can visually recognize the reflected light.

$$P_1 = d \sin\theta_1 = m\lambda \text{ (m being a natural number)} \qquad \text{Equation (2)}$$

In the case of m=1, $\theta_1 = \arcsin(\lambda/d)$

On the other hand, when viewing angle $\theta_2$ satisfies the following equation (3), the two reelected lights weaken each other, and the observer cannot visually recognize (or is difficult to visually recognize) the reflected light.

$$Q_2 = d \sin\theta_2 = (m - \tfrac{1}{2})\lambda \text{ (m being a natural number)} \qquad \text{Equation (3)}$$

In the case of m=1, $\theta_2 = \arcsin(\lambda/2d)$

In FIG. 3, the angle formed by the mid point between the two pits 202P-1 and 202P-2 and the direction to the observation point is defined as the viewing angle θ. Since, compared with the distance between the two pits of about several µm, the viewing distance is several ten cm, there is a roughly ten thousand times difference. Accordingly, the reflected lights from the two pits 202P-1 and 202P-2 can well be approximated to be parallel lights.

As a result, a holographic visual effect is achieved that, the reflected light by pits 202P-1 and 202P-2 strengthen each other in the direction of viewing angle $\theta_1$ in which the optical path difference is λ, and then the observer can perceive the light visually, while, on the other hand, in the direction of viewing angle $\theta_2$ in which the optical path difference is λ/2, the observer cannot perceive the light visually.

Figure 4:
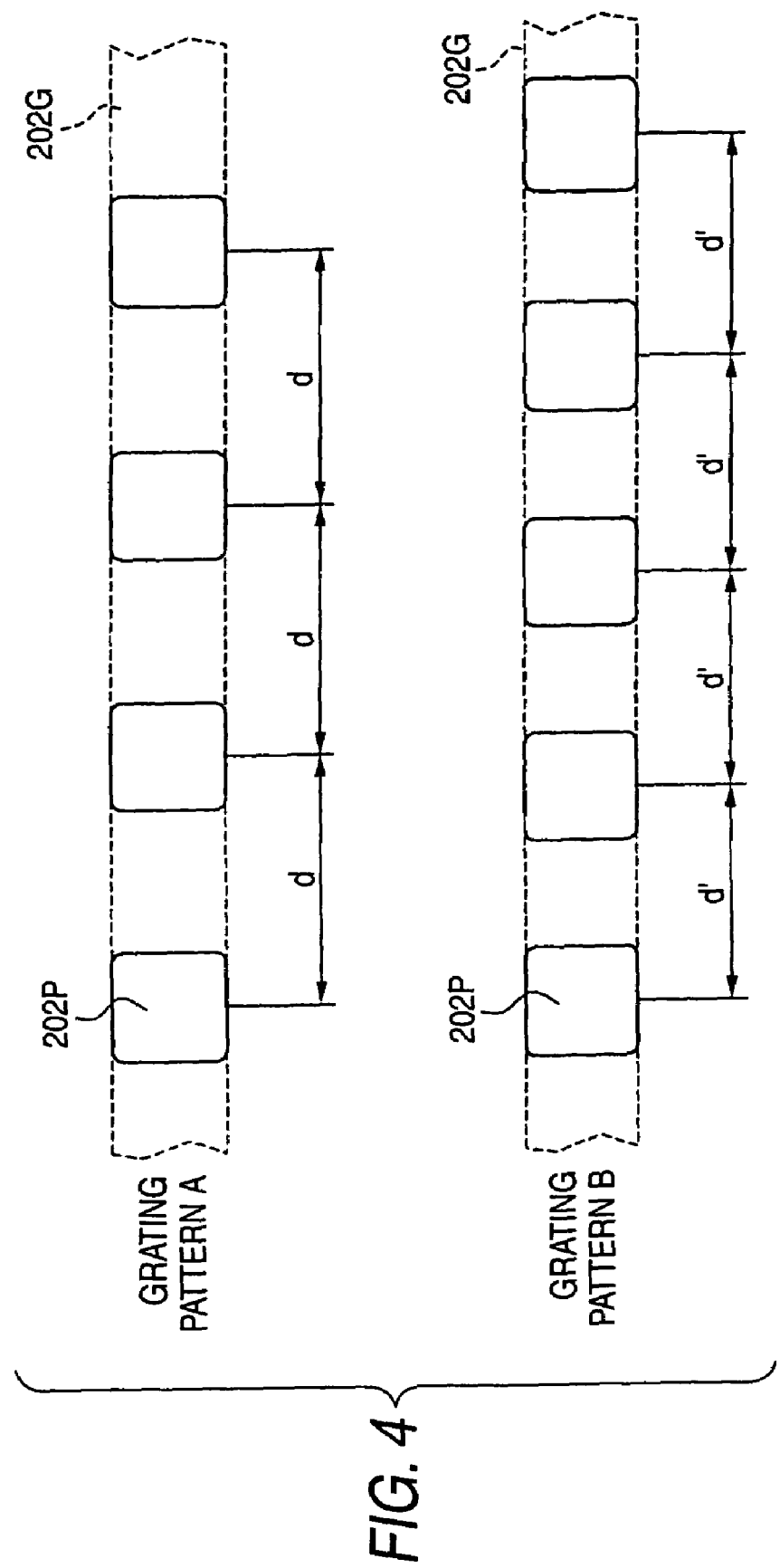
FIG. 4 is a diagram to explain the pattern of the diffraction grating formed by pits 202P.

Here, the value of viewing angle θ is determined by the values of the wavelength of the impinging light λ and inter-grating distance d. Thus, as shown in FIG. 4, by changing the inter-grating distance d itself, the wavelength of the impinging light λ that the observer can visually perceive and viewing angle θ can be controlled. The fact that the visually perceivable wavelength of light is controllable can be restated that the visually perceivable color can be controlled.

Configuration of the Optical Disc Recording Apparatus

Now, the optical disc recording apparatus 100 which can form a diffraction grating comprising the above-described pits 202P is described.

Figure 5:
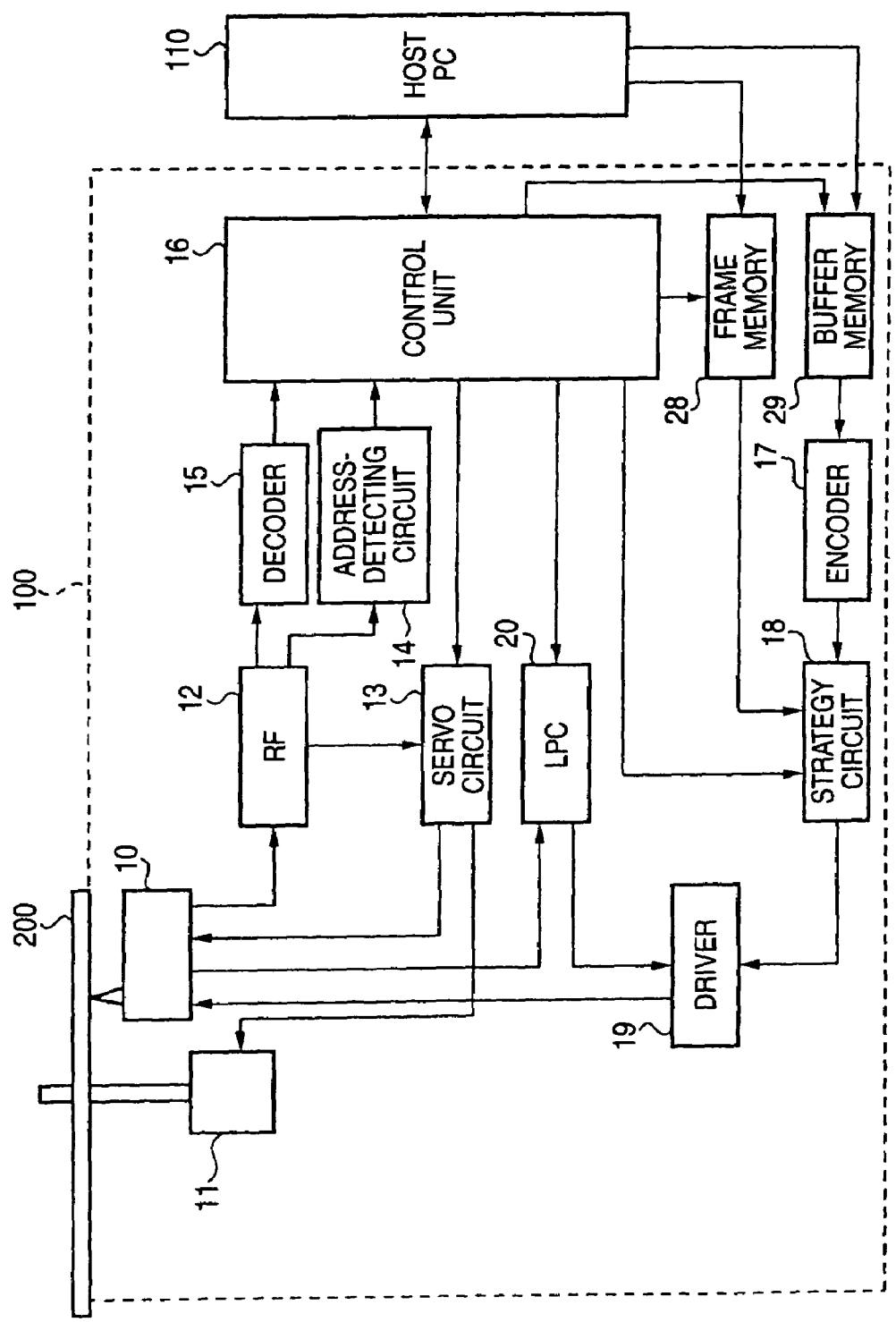
FIG. 5 is a configurational diagram of an optical disc recording apparatus 100 associated with the embodiment of the invention.

FIG. 5 is a block diagram of an optical disc recording apparatus 100 according to the present embodiment.

In the apparatus, a control unit 16 supervises all the individual units of the apparatus according to the program having been stored in advance in a memory (not shown), and conducts data recording and image drawing in an optical disc 200.

A spindle motor 11 is used for driving the optical disc (CD-R disc) 200 to rotate. In the present embodiment, optical disc 200 is assumed to rotate at a constant angular velocity (CAV: Constant Angular Velocity).

An optical pickup 10 is a unit integrating an optical system containing a laser diode, lens, and mirror, and a photo acceptance device accepting the returning light.

In the case where data recording or the regeneration of the recorded data is carried out for the optical disc 200, optical pickup 10 irradiates the optical disc 200 with laser light whereby the pickup receives the returning light. The optical pickup 10 outputs to an RF amplifier 12 an RF signal modulated by EFM (Eight to Fourteen Modulation) that is the signal generated by light acceptance.

Further, the optical pickup 10, which has a monitor diode, supplies a signal corresponding to the electric current level to a laser power control circuit 20 when an electric current flows in the monitor diode in laser light irradiation.

The RF amplifier 12 outputs signals relating to the reflected light obtained by laser light irradiation on the optical disc 20 to a servo circuit 13 and an address detecting circuit 14 during data recording or image drawing. Moreover, in the reproduction of the recorded data, the RF amplifier 12 amplifies the RF signals modulated by FEM supplied from optical pickup 10, and outputs the amplified RF signals to servo circuit 13 and a decoder 15.

During the reproduction of recorded data, decoder 15 constructs reproduction data via EFM demodulation of the EFM-modulated RF signals supplied from RF amplifier 12.

Address detection circuit 14 extracts the wobble signal component from the signals supplied by RF amplifier 12, from which address information (the positional information for the disc) contained in the wobble signal component is demodulated from the signal supplied from RF amplifier 12, and outputs to control unit 16 during data recording or image drawing.

A servo circuit 13 carries out rotation control for spindle motor 11, and focusing control as well as tracking control for optical pickup 10.

Laser power control circuit 20 is a circuit to control the laser power emitted from the laser diode of optical pickup 10. Laser power control circuit 20 controls a laser driver 19 so that the laser light with the optimal laser power for the formation of pits 202P in the optical disc 200 be emitted from optical pickup 10 based on the electric current value supplied from the monitor diode of optical pickup 10 together with the information indicating the target value of the optimal laser power supplied from control unit 16.

A buffer memory 29 memorizes the data supplied from a host computer 110 at the time of data recording, i.e., the data to be recorded in optical disc 200 (recording data) in the FIFO (First In First Out) mode. An encoder 17 EFM-modulates the recording data taken out from buffer memory 29 to output to a strategy circuit 18. The strategy circuit 18 conducts a time-scale correction treatment on the EFM signals supplied from encoder 17 and outputs to a laser driver 19.

The laser driver 19 drives the laser diode in the optical pickup 10 based on the signals modulated according to the recorded data supplied by strategy circuit 18 together with the control of laser power control circuit 20.

Figure 6:
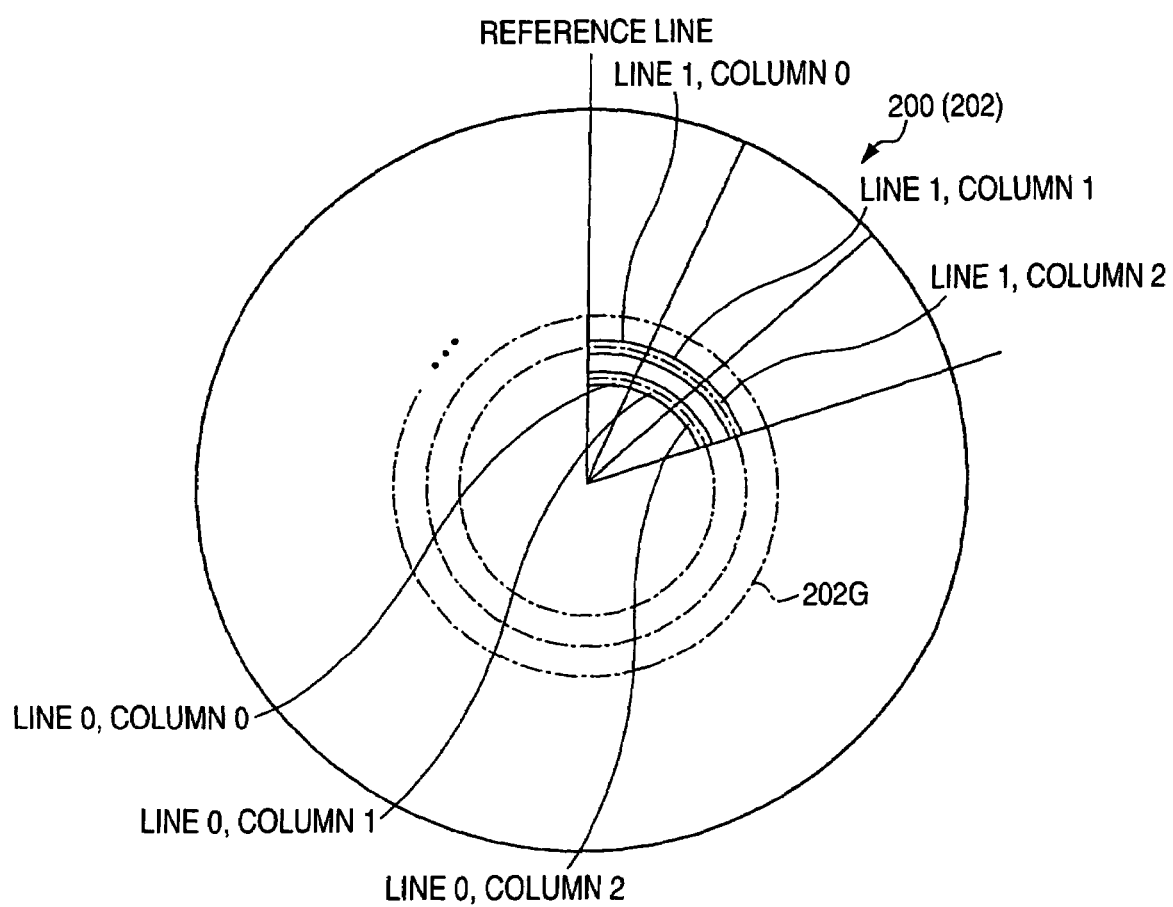
FIG. 6 illustrates the coordinate system adopted in the embodiment of the invention.

FIG. 6 shows the coordinate system adopted for conducting image drawing in the present embodiment. As shown in FIG. 6, the starting point of a groove 202G positioned at the inner periphery of the disk is defined as the reference point (line 1, column 1). From this reference point toward the outer periphery of the disc, the line number is assigned as line 1, line 2, line 3, etc. in turn. On the other hand, from the reference point (line 1, column 1), column 1, column 2, column 3, etc. are defined in the clockwise order in coordination with other radial lines.

Into frame memory 28, as shown in FIG. 7, the data allotted to each line and column are stored. The individual data correspond to a single coordinate in the above-described coordinate system, i.e., to a single domain of optical disc 200, and are equivalent to the data that specify the pattern of the diffraction grating to be formed in that domain. In FIG. 7, at the coordinate position shown by "A", a diffraction grating of pattern A is formed, while at the coordinate position shown by "B", a diffraction grating of pattern B is formed. For confirmation, at the coordinate position shown by "0", no diffraction grating is formed.

In the present embodiment, as shown in FIG. 8, the patterns of diffraction grating to be formed in optical disc 200 are determined in advance. The pattern of diffraction grating is specified by the spacing (inter-grating distance) d with which pits 202P constituting the diffraction grating are formed, the length of single pit 202P, and the variation quantities (Δ and δ) of the two. By way of precaution, variation quantities δ and Δ are parameters for finely adjusting the length of pit 202P determined in advance by carrying out recording experiments. Variation quantities δ and Δ may be zero.

Further, for the formation of each diffraction grating, the information (referred to as laser information) associated with the irradiation interval and intensity level of the laser light to be applied from the optical pickup 10 to optical disc 200 (recording layer 202) is obtained beforehand via, for example, experiments. Such laser information is stored in the memory of control unit 16 in the form of a table (Refer to FIG.

8.) that is in coordination with the diffraction grating patterns. For confirmation, this table may be stored in the host PC 110.

In the present embodiment, as shown in FIG. 7, data were configured so that the same diffraction grating pattern is formed in this region by setting 10 columns×10 lines as a unit. Such measure is based on the consideration that, for the smallest region for visual perception by human eye, the diffraction gratings of the same pattern are formed to achieve a reliable image perception (hologram perception). The unit of 10 columns×10 lines is just an example, and a region other than this exemplary one may be regarded as one unit.

The data stored in frame memory 28 are read out one-by-one by control unit 16. And the laser information corresponding to the data read out in this manner is supplied to strategy circuit 18. In strategy circuit 18, strategy signals are formed corresponding to the irradiation interval and intensity level of the laser light indicated by the laser information for each coordinate, and the signals are supplied to a laser driver 19. Laser driver 19 drives the laser diode of the optical pickup 10 based on the supplied strategy signals.

Here, the strategy signals outputted from strategy circuit 18 are explained.

Figure 9:
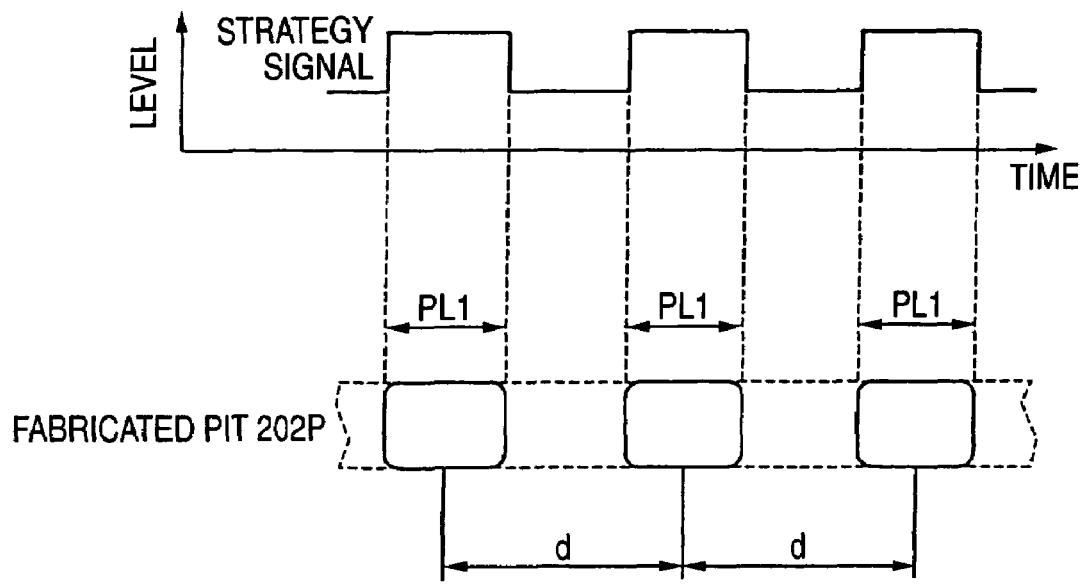
FIG. 9 is a diagram showing the content of strategy signal.

FIG. 9 shows the content of the strategy signals outputted from strategy circuit 18 under the control of control unit 16. The abscissa corresponds to a time axis, and the ordinate to the level of the irradiated laser light. The details of the laser light from the optical pickup 10 for the optical disc 200 are controlled depending on the strategy signal (pulse width and pulse interval).

In FIG. 9, the details of the strategy signals and the details of pits 202P formed in the optical disc 200 are shown side by side. In FIG. 9 is depicted a description in which the pulse width of the strategy signal corresponds to the length of pit 202P; but actually, by taking into consideration of the effect of heat conduction accompanied by laser light irradiation, the strategy signal is subjected to time correction.

Operation During Image Drawing

Next, the details of the specific operation during image drawing, i.e., during the production of a hologram based on diffraction gratings on the optical disc 200 will be explained.

Figure 10:
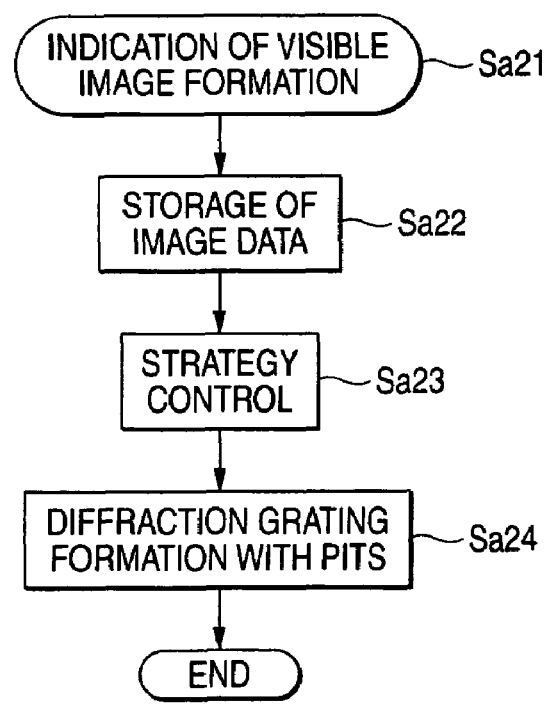
FIG. 10 is a flow-chart showing the control details of a control unit 16.

FIG. 10 is a flow-chart showing the details of control by control unit 16 during image drawing.

As a preliminary step for image drawing, along with mounting an optical disc 200 into an optical disc recording apparatus 100, the user operates the host PC 110, and specifies the details of the image to be drawn (letters and designs) and the position for hologram formation (the position in optical disc 200). Then, the user designates which diffraction grating pattern is used for image drawing for each image that the user wants to fabricate as a hologram. In other words, the formation spacing (inter-grating distance) D for pit 202P for image drawing is indicated.

Once the start of image drawing is instructed by the user (Step Sa21), control unit 16 regulates the individual parts of the apparatus to draw the image on the optical disc 20 as follows.

Control unit 16, when image data relating to the image indicated by the user are supplied from host PC 110, stores the data in turn in frame memory 28 corresponding to the position for hologram formation (Step Sa22). At this step, control unit 16 stores the information showing the diffraction grating pattern designated by the user at the corresponding coordinate position (See FIG. 7.).

Thereafter, control unit 16 controls the individual parts of the apparatus to read out the data for a single coordinate and supply the corresponding laser information (Refer to FIG. 8.) to strategy circuit 18 (Step Sa23). In strategy circuit 18, strategy signals which achieve the irradiation interval and intensity level of the laser indicated by the laser information are generated and outputted to laser driver 19. With such signals, a laser light is applied onto the optical disc 200 (recording layer 202), and pits 202P are formed in turn so as to form the diffraction grating pattern designated by the user (Step Sa24).

The above-described operation assumes the case wherein the user designates one diffraction grating pattern for a single image, but in the case of drawing a plurality of images, the system may be so designed that a diffraction grating pattern can be indicated for each image whereby the above-described control is carried out for each image by control unit 16.

SPECIFIC EXAMPLE

Some specific examples of drawing images by fabricating diffraction gratings as has been explained heretofore are described.

(1) Stereogram

In the explanation heretofore, the viewing angle θ of the observer was treated as a single value, but actually, the observer has viewing angles delicately different between the right and left eyes: let the viewing angle of the right eye be θR, and let that of the left eye be θL, then viewing angles θR and θL take delicately different values. By taking into account such attribute, a stereoscopic 3D (three dimensions) visual effect can be attained by separately preparing in advance the laser information for the fabrication of a diffraction grating pattern for the right eye and the one for the fabrication of a diffraction grating pattern for the left eye, and fabricating the two kinds of diffraction grating alternately in the same region of optical disc 200.

Figures 11A, 11B, 11C:
FIGS. 11A to 11C are diagrams to explain the actual effects of the invention.

More specifically stated, a region of the optical disc 200 (recording layer 202) is divided, as shown in FIG. 11A, so as for the domain for the right eye and that for the left eye to appear alternately. The size of each domain is arbitrary, exemplified by a domain arrangement consisting of rectangles having from several wavelengths to several hundred μm edges. Domain arrangements comprising cells of several ten to 200 μm in size are preferred. And in the domain for the right eye, a diffraction grating pattern visually perceived at viewing angle θ R is fabricated, and in the domain for the left eye, a diffraction grating pattern visually perceived at viewing angle θ L is fabricated. When the diffraction gratings thus fabricated are viewed with both eyes, the formation region (image) where such diffraction gratings are fabricated is recognized stereoscopically, thus exerting a so-called 3D visual effect.

(2) Fabrication of Design and Letter in the Same Position

A region of the optical disc 200 (recording layer 202) is divided into domains for design formation and those for letter formation as shown in FIG. 11B. And, the domains for design formation is drawn with a diffraction grating pattern with an inter-grating distance d1 whereas the domains for letter formation is drawn with a diffraction grating pattern with a different inter-grating distance d2.

By drawing images with use of different inter-grating distances din such a manner, a special visual effect is attained that, when the optical disc 200 is gradually inclined, the design is visually recognized at a certain viewing angle, and the letter is visually recognized at another viewing angle.

(3) Flashing

A diffraction grating pattern for the normal mode image of a certain design and one for the reversal mode image thereof may be alternately fabricated whereby a special visual effect is exhibited such that, with gradual inclination of the optical disc 200, the normal mode image can be visually perceived at a viewing angle whereas at another viewing angle the reversal mode image can be visually perceived, and so forth.

(4) Movement

A plurality of the same design maybe formed in different domains of the optical disc 200.

FIG. 11C illustrates the case in which a musical note "♪" is drawn for each of three different positions (position I, position II and position III). When diffraction grating patterns with different inter-grating distances d are used for the drawing of the individual notes, the visually recognizable viewing angles θ differ for the individual notes.

Accordingly, a special visual effect is exhibited as if the musical note "♪" is changing its position since, when optical disc 200 is gradually inclined, the musical note "♪" recognized as placed at position I at a viewing angle θ1 is later recognized as placed at position II at a viewing angle θ2, and further at still another viewing angle θ3, recognized as placed at position III.

(5) Coloration

A diffraction grating may be fabricated by forming pits 202P in such a pattern as shown in FIG. 12 wherein the length of pit 202P changes stepwise in both of the radial direction the disk and the direction of groove 202G. It is known that, when a visible light (40 to 700 nm light) is applied onto the optical disc 200 in which such diffraction grating patterns are repeatedly fabricated, the visually recognized wavelength of the reflected light differs depending on the viewing angle. The fact that the wavelength of the visually recognized reflected light is different each other means that the recognized color differs depending on the viewing angle.

Accordingly, when letters and designs are drawn in such a manner that diffraction grating patterns are formed on the optical disc 200 as shown in FIG. 12, at a certain viewing angle the letters or designs are perceived with a reflected light of a specific wavelength (e.g., a red light), and at another viewing angle the letters or designs are perceived with a reflected light of another specific wavelength (e.g., a blue light) during gradual inclination of the optical disc 200. In such a manner, a special coloration effect that the color changes depending on the viewing angle can be exhibited.

As has been described hereinabove, according to the optical disc recording apparatus 100 associated with the present embodiment, images exhibiting a holographic visual effect can be easily formed by using a diffraction grating pattern which has been prepared in advance.

Modified Example

Each embodiment described above is just an example for the description of the details of the invention, and appropriate modifications can be made on them. Some modified examples are set forth below.

Modified Example 1

Though, in every embodiment described heretofore, a method of forming images with a hologram effect in the track direction (θ direction) of the optical disc 200 was explained, images can be formed in the radial direction (r direction) too. In this case, though the degree of freedom for visual image formation is lowered due to the track pitch value, this difficulty can be avoided by contriving the pit formation in view of track pitch.

Modified Example 2

In all the embodiments described hereinabove, the system was constructed so that a host PC 110 as an external apparatus supplies image data to optical disc recording apparatus 100. But, image data may be stored beforehand in a memory (not shown) in the optical disc recording apparatus 100. When the image to be drawn is limited to characters such as letters and figures, the total image data volume are small. Thus, when the image data is stored before hand in the optical disc recording apparatus 100, such an apparatus can fabricate a hologram based on a diffraction grating as a single stand-alone apparatus.

Modified Example 3

The image formation for time-stamp information relating to date and time can be automatically carried out without any indication of the user at every occasion of, for example, music data recording whereby the system may be constructed so that the image data associated with time-stamp information is supplied from an external apparatus (host PC 110) to the optical disc recording apparatus 100.

Modified Example 4

Optical disc 200 is manufactured and provided by a number of manufacturers, and, in the current situation, the characteristics of the recording layer 202 (groove 202G) is different for each manufacturer. For example, the difference in the heat absorbing ratio of recording layer 202 results in the difference in the intensity of the laser light to be irradiated for diffraction grating formation. In view of these aspects, it is preferable to determine the optimal irradiation intensity of the laser light through experiments of diffraction grating formation conducted in advance for optical discs 200 manufactured by a number of manufacturers.

In such cases, by letting the optimal irradiation intensity of the laser light in coordination with the information (disc ID information) for identifying optical discs 200 stored in a memory, the optimal laser light irradiation for an optical disc 200 placed in the recording apparatus can be achieved by reading out the disc ID information relating to the optical disc 200 in use.

As has been explained heretofore, by using an optical disc recording apparatus associated with the invention, drawing of images of a high designing nature (exhibiting a holographic visual effect) on an optical disc can be readily accomplished.

This application claims priority on Japanese Application No. 2002-332686, filed Nov. 15, 2002, and is incorporated fully herein by reference.

What is claimed is:

1. A method of inscribing by laser light a diffraction grating on an optical disc by an optical disc recording apparatus to produce a holographic visual effect when light is reflected from said diffraction grating the method comprising:
    a storing step of storing, in advance, laser information indicating irradiation interval and intensity level of the laser light to be applied to the optical disc associated with a formation spacing to produce pits having the same lengths and formed at a constant interval and
    a control step of controlling the laser light, when inscribing by laser light is instructed together with an indication of the formation spacing, so as to correspond to the irradiation interval and the intensity level of the laser light indicated by the laser information corresponding to the indicated formation spacing;
    wherein the irradiation interval is determined according to a predetermined visible light wavelength and predetermined viewing angle.

2. A method of inscribing by laser light irradiation a diffraction grating on an optical disc by an optical disc recording apparatus to produce a holographic visual effect when light is reflected from said diffraction grating, the method comprising:
- a storing step of storing laser information indicating irradiation timing and intensity level of the laser light to be applied to the optical disc for step wisely changing at least one of length and formation spacing of pits formed in said optical disc by said laser light; and
- a control step of controlling the laser light irradiation, when inscribing by laser light is instructed, based on the laser information;
- wherein the irradiation interval is determined according to a predetermined visible light wavelength and predetermined viewing angle.

3. A computer readable recording medium storing a program for inscribing by laser light irradiation a diffraction grating on an optical disc by an optical disc recording apparatus to produce a holographic visual effect when light is reflected from said diffraction grating, the program causing a computer to function as:
- a storing unit for storing, in advance, laser information indicating irradiation interval and intensity level of the laser light to be applied to the optical disc associated with a formation spacing to produce pits having the same lengths and formed at a constant interval;
- a control unit for controlling the laser light, when inscribing by laser light is instructed together with an indication of the formation spacing, so as to correspond to the irradiation interval and the intensity level of the laser light indicated by the laser information corresponding to the indicated formation spacing;
- wherein the irradiation interval is determined according to a predetermined visible light wavelength and predetermined viewing angle.

4. A system for inscribing by laser light a diffraction grating on an optical disc including an optical disc recording apparatus to produce a holographic visual effect when light is reflected from said diffraction grating, the system comprising:
- a storing unit for storing, in advance, laser information indicating irradiation interval and intensity level of the laser light to be applied to the optical disc associated with a formation spacing to produce pits having the same lengths and formed at a constant interval; and
- a control unit for controlling the laser light, when inscribing by laser light is instructed together with an indication of the formation spacing, so as to correspond to the irradiation interval and the intensity level of the laser light indicated by the laser information corresponding to the indicated formation spacing;
- wherein the irradiation interval is determined according to a predetermined visible light wavelength and predetermined viewing angle.

* * * * *